United States Patent [19]
Seely et al.

[11] 3,731,287
[45] May 1, 1973

[54] SINGLE DEVICE MEMORY SYSTEM HAVING SHIFT REGISTER OUTPUT CHARACTERISTICS

[75] Inventors: John Leland Seely, Fort Salonga; Leo Cohen; Ronald P. Colino, both of Commack, all of N.Y.; Robert E. Pace, Glenrothes, Scotland

[73] Assignee: General Instrument Corporation, Newark, N.J.

[22] Filed: July 2, 1971

[21] Appl. No.: 159,365

[52] U.S. Cl. ................................340/173 R, 307/238
[51] Int. Cl. ..............................................G11c 11/40
[58] Field of Search .......................340/173 R, 174 A; 307/238, 279, 304

[56] References Cited

UNITED STATES PATENTS 3,355,710 11/1967 Schubert ..........................340/174 A
3,478,332 11/1969 Heymann .........................340/174 A

OTHER PUBLICATIONS

Electronics, Aug. 3, 1970 pg. 68 to 73

*Primary Examiner*—James W. Moffitt
*Attorney*—Maxwell James et al.

[57] ABSTRACT

A memory or delay system having a fixed address layout provides an output of the shift register type with a significant decrease in the number of transistors per bit required resulting in a greatly increased storage capacity. A plurality of memory cells are arranged in a fixed address array and means are provided for addressing all memory cells in timed sequence. THe addressing means comprises a row ring counter and a column ring counter responsive to the row ring counter and effective to sequentially address each column of memory cells after a complete row address cycle. A plurality of column conductors operatively connect the memory cells in each column to a common output circuit and are adapted to transfer the data signal stored in the selected address to said output circuit.

Means are provided to clear all column conductors to a given reference voltage prior to each addressing operation, all memory cells being isolated from their respective column conductors during this clearing operation.

A refresh amplifier is provided for each column conductor and is effective to develop an output signal corresponding to the data signal stored in the memory cell of the selected row, at an enhanced signal level, and to feed back that enhanced signal to the memory cells in the selected row. Means operatively connected to the column address means are provided to disable the feedback means of the amplifier in the selected row.

29 Claims, 6 Drawing Figures

INVENTORS
JOHN LELAND SEELY
LEO COHEN
RONALD P. COLINO
ROBERT E. PACE
BY
James and Franklin
ATTORNEYS INVENTORS
JOHN LELAND SEELY
LEO COHEN
RONALD P. COLINO
ROBERT E. PACE
BY James and Franklin
ATTORNEYS

INVENTORS
JOHN LELAND SEELY
LEO COHEN
RONALD P. COLINO
ROBERT E. PACE

BY James and Franklin
ATTORNEYS

INVENTORS
JOHN LELAND SEELY
LEO COHEN
RONALD P. COLINO
ROBERT E. PACE
BY
*[signature]*
ATTORNEYS INVENTORS
JOHN LELAND SEELY
LEO COHEN
RONALD P. COLINO
ROBERT E. PACE
BY James and Franklin
ATTORNEYS

SINGLE DEVICE MEMORY SYSTEM HAVING SHIFT REGISTER OUTPUT CHARACTERISTICS

The present invention relates generally to binary or digital storage and/or delay systems, and more particularly to a storage matrix with means for sequentially sampling and refreshing the data signals stored therein, thereby to produce a shift register type output.

Data storage and delay systems are basic components of any digital computer system and have as primary functions the storage and transmission of information, usually in bit or word form. The data is commonly stored at one of two discrete signal levels, corresponding to a logic "0" or "1," thereby to establish the two logical conditions utilized in binary data processing.

There are essentially two different types of digital data storage systems. In one system information is stored in a fixed location or address. This type of memory generally comprises a matrix of data storage devices or memory cells in the form of magnetic cores, capacitive storage devices, etc. The second type of storage system involves moving storage mediums where information is continually shifted from one storage cell to the next. Typical systems under this category are magnetic drums or tapes and electronic shift registers. This invention is concerned with memory and delay systems utilizing a matrix of capacitive storage devices having the output characteristics however, of moving storage mediums, such as electronic shift registers.

Electronic shift register systems are well known logic components. They have many uses, among which memory and time delay are the most important. They may be characterized as systems which receive a data signal and, controlled by a shifting or clock signal, transfer that data signal to another system of the same or different character. As is well known, a plurality of such circuits may be connected together, the data signal finally emerging from the last stage after it has been shifted serially from circuit to circuit through the entire array during a series of clocked intervals.

In a typical shift register employing electronic switching devices, each stage receives clock pulses which are effective during each clock pulse cycle to shift or transfer data from one stage to a succeeding stage. The period of each clock pulse cycle is generally designated as 1 bit of the data transfer, that is, each data shifting operation is performed during 1 bit. That unit of a shift register capable of introducing a time delay of 1 bit to a data signal in likewise referred to as 1 bit of the register. Thus, for example, in a shift register having 10 bits, the data appears at the output stage 10 bits after it is applied to the input stage.

One problem involved in such shift register systems is that of data signal retention. Usually each bit of the shift register will retain a given data signal at a node capacitance thereof for only a limited period of time, thus placing a definite lower limit on the shift frequency which can be used; if shifting of the data signal from one system to another is not carried out rapidly enough the data signal will become lost through capacitive leakage.

A second problem associated with shift registers, particularly when used as memories, is that of storage density. A typical shift register system of the type described utilizes a minimum of six switching devices per bit. Thus, for example, a 2,000 bit register requires 12,000 electronic switching devices. While systems of this type have proved to be highly effective as memory and delay devices, the requirement of six switching devices for each register bit, particularly in view of the fact that in many memory applications systems capable of storing thousands of bits of data are required, necessitates the use of a relatively large number of switching devices as compared, for example, to matrix memories. The need for that relatively large number of switching devices in each register bit, and thus in the entire memory or delay system, results in an inevitable reduction in the storage density of data in that system and increases the cost and complexity of the system.

In recent years, a new technology has been developed in which a plurality of switching devices are fabricated in an integrated circuit, that is, a circuit which can be substantially completely fabricated on a very small physical element such as a chip of semiconductor material. In the fabrication of these integrated circuit chips it has been found particularly effective to utilize field effect transistors (FETS) which are effective as high speed switching devices. These transistors are formed on a chip of semiconductor material by performing appropriate operations on suitably doped regions of the semiconductor substrate to produce the basic elements forming an individual FET. These elements include a control terminal generally termed the gate and a pair of output terminals generally termed the source and drain respectively. In one type of FET if the signal at the gate is negative with respect to its drain terminal the output circuit between the source and the drain is closed, that is the device is in the "on" state. If the signal at the gate is positive with respect to the drain terminal, the output circuit is characterized by an extremely high impedance equivalent to an open circuit, that is, the device is in the "off" state. Another type of FET functions in just the opposite fashion. A particularly effective FET utilizes an oxide gate insulator and is known as a MOS (metal oxide silicon) FET.

In the operation of a typical shift register of the prior art type here under consideration, the shifting operations are performed under the control of timed clock signals. Generally such circuits are adapted to be controlled by two-phase logic comprising two alternative sequential clock pulses defining two clock intervals, respectively. A complete shift operation comprises two such intervals. During one interval a node capacitance is operatively connected to a negative voltage source and is thereby conditionally charged or discharged depending upon the presence or absence of a conductive discharge path across said voltage source. The availability of such a discharge path in turn depends upon the logic level of the data input signal impressed upon the gate terminal of a FET disposed in such discharge path. In the case of an open discharge path, once the node capacitance has been fully charged current flow ceases and quiescent power dissipation is zero. In accordance with this process the complement of the data input signal is deposited and stored at an operative node capacitance during the first clock interval. A second transfer stage controlled by the second clock pulse is adapted to again invert the signal thus stored and to deposit the reconstitution of this input data signal at the output of the first bit of the register.

In existing MOSFET shift register circuits, circuit nodes are typically adapted to be charged negative by means of a clocked load device, comprising a MOSFET having a relatively high "on" resistance interposed between the negative supply voltage and the nodes to be charged. The clock capacitances are made up primarily of the gate capacitance of the clocked load FETS. Accordingly, the power dissipated in generating the clock signals used to drive such large load FETS is a significant factor in system design. The longer the shift register the larger the clock capacitance. Thus, for example in a two-phase shift register 200 bits long, the clock capacitance is typically about 60 pf. Accordingly, to drive a long register (i.e. 2,000 bits) or several short registers, with a common clock may present significant power problems. Indeed in some cases it is found that more power is dissipated in the clock generator than in the registers themselves. As a result the permissible length and thus the data storage density of prior art shift registers is severely limited.

By contrast to shift registers, the fixed address type of memory system generally comprises a plurality of data storage elements arranged in a matrix defined by intersecting rows and columns, the address for each memory unit being defined by an intersection of a given row and a given column. In accordance with a predetermined program, which establishes the logic operation of the entire computer system, a word or bit is either read from a preselected address or a new word or bit is inserted into that selected address. The nature of the operation (read or write), as well as the selected data address is determined by logic address circuitry receiving input data from the program input. The logic operation on the memory may generally be performed in a random manner. Accordingly, memories of this type are commonly referred to as random access read-write memories.

For optimum effectiveness a random access memory of the type described should be able to store a large number or density of words or bits in a minimum volume so that the space requirement of the system may be relatively small without sacrificing the amount of data which can be stored therein. Further desirable features of this type of system include reduced cost of the system during initial production and in its subsequent use, and that the readout of data from a selected address of the memory system be non-destructive, that is, the operation of reading a word from a selected address should not destroy the presence of that word at that address.

In application, Ser. No. 809,223 filed Mar. 21, 1969 by John O. Paivinen et al., entitled "Read-Write Random Access Memory System Having Single Device Memory Cells," assigned to the assignee of the present application, an improved memory system of this type is disclosed in which the memory cells are provided at locations defined by the intersections of a plurality of rows and columns. Each memory cell comprises a single switching device in the form of a field effect transistor having a control terminal or gate, and a pair of output terminals designated as the source and drain. A capacitive data storing element, at which a data signal is to be stored at one of two discrete logic levels, is operatively connected to one of the output terminals, and an addressing signal is selectively applied to the gate and is effective when present to actuate the transistor, thereby to operatively connect the source and drain and to transfer the data signal from the storing element to an output node to which the second output terminal is operatively connected. Each memory cell in a given column is operatively connected to a common conductor. To prevent data destruction upon a read operation a refresh amplifier is operatively connected to that conductor. Appropriate random address circuitry is separately provided.

By utilizing only a single field effect transistor in each of the memory cells that memory represented a substantial improvement in data storage capacity as compared to previously known memories of the type described.

It is a primary object of the present invention to combine the increased storage capacity of the above mentioned single cell memory matrix with a novel continuous sequential address and refresh system, thereby to provide a memory and/or delay system having a shift register type output with a significant decrease in the required number of transistors per bit.

It is another object of the present invention to provide a memory or delay device with a shift register type output having improved data retention characteristics thereby providing increased flexibility.

It is yet another object of the present invention to design a memory utilizing capacitive storage devices in conjunction with high speed switching devices arranged in a fixed address matrix in which continuous sequential sampling provides an output of the type generated by moving storage and delay mediums.

It is still another object of the present invention to provide an electronic memory or delay system having a continuously shifting output of the shift register type in which the number of switching devices required for a given data storage capacity is significantly reduced.

A further object of the present invention is to design a memory or delay system of the type described in which power dissipation for a given storage capacity is significantly reduced.

It is yet another object of the present invention to design a memory system of the fixed address type utilizing continuous sequential data sampling to provide a clocked shifting data output, in which the power required to drive the system with a common clock is radically reduced as compared to prior art clocked systems having an output of this type.

It is still another object of the present invention to provide a memory system of the type utilizing electronic switching devices in which the number of additional switching devices required for a given increase in storage density decreases with increased storage capacity.

It is an additional object of the present invention to provide a memory system of the fixed address type, wherein the data stored in the memory units is continuously sampled and refreshed, thereby to provide a constantly shifting nondestructive data read-out.

It is still another object of the present invention to design a memory and/or delay system having a continuously shifting data output which provides increased speed of operation, greater flexibility, and increased storage density, all at reduced expense as compared to prior art systems.

To these ends there is provided a memory and/or delay system in which data is stored at a plurality of memory cells arranged in a predetermined manner to define a plurality of data addresses or locations. Each memory cell comprises a single switching device in the form of a field effect transistor (FET) having a control terminal and a pair of output terminals. A data storing element, preferably in the form of a capacitive storage device, at which a data signal is to be stored at one of two discrete logic levels, is operatively connected to one of the output terminals. The other output terminal is operatively connected to a data output node at which the stored data is adapted to be read upon actuation of the control terminal.

The memory cells are arranged at locations defined by the intersections of a plurality of rows and columns. The control terminal of each FET in a given row is operatively connected to a common row conductor defining a row select line and the output nodes of each FET in a given column are operatively connected to a common column conductor defining a column line.

Means, preferably in the form of a ring counter, are provided to periodically actuate all FETs in a given row by the application of an addressing signal to each row select line in timed sequence.

Each of the column lines is operatively connected to the data output terminal through an output or read switching device and to the data input terminal through a data input or write switching device. Means, preferably in the form of a second ring counter, are provided for simultaneously actuating both the input and output switching devices in each column in timed sequence, the frequency of actuation being $1/n$th of the frequency of row selection where $n$ is the number of rows in the memory. Accordingly, column actuation takes place at intervals corresponding to the time it takes to sample the data in all rows. During each cycle of operation data may be sequentially transferred into or read out of each memory cell in the matrix.

As a result of the configuration of the memory cell a repeated row selection results in a dissipation of the stored data. Accordingly, a data refresh amplifier is provided for each column and is effective to restore the data signal to the data storage devices in the unselected columns each time the switching device associated therewith is actuated by a row select signal. The refresh amplifier is provided with an improved bootstrap arrangement to rapidly drive the output voltage level corresponding to the data signal stored in the memory cell of the selected row, thereby to provide an output signal of the proper polarity at an enhanced level substantially instantaneously. The enhanced outputs at the unselected columns are returned to the data storage elements in the selected row by means of switching device controlled by the column select circuitry.

To the accomplishment of the above and to such other objects as may hereinafter appear, the present invention relates to a memory or delay system of the fixed address type having shift register output characteristics as defined in the appended claims and as described herein with reference to the accompanying drawings, in which:

The present invention relates to a memory or delay system of the fixed address type wherein data may be sequentially written into or read out from the memory system in a substantially continuous fashion. The system herein specifically disclosed can be completely fabricated on a single chip of semiconductor material such as that designated 10 in FIG. 1. That chip contains a plurality of memory cells 12 arranged in a predetermined pattern. Each memory cell stores data in bit form at one of two discrete logic levels corresponding to a logic "1" or logic "0" condition. Chip 10 also preferably contains the circuitry required for sequential addressing, sampling and data refreshing as hereinafter described. If desired, a plurality of such chips may be connected together along with a suitable sequential chip select circuitry to form a memory or delay system having increased data storage capacity.

Figures 1, 2:
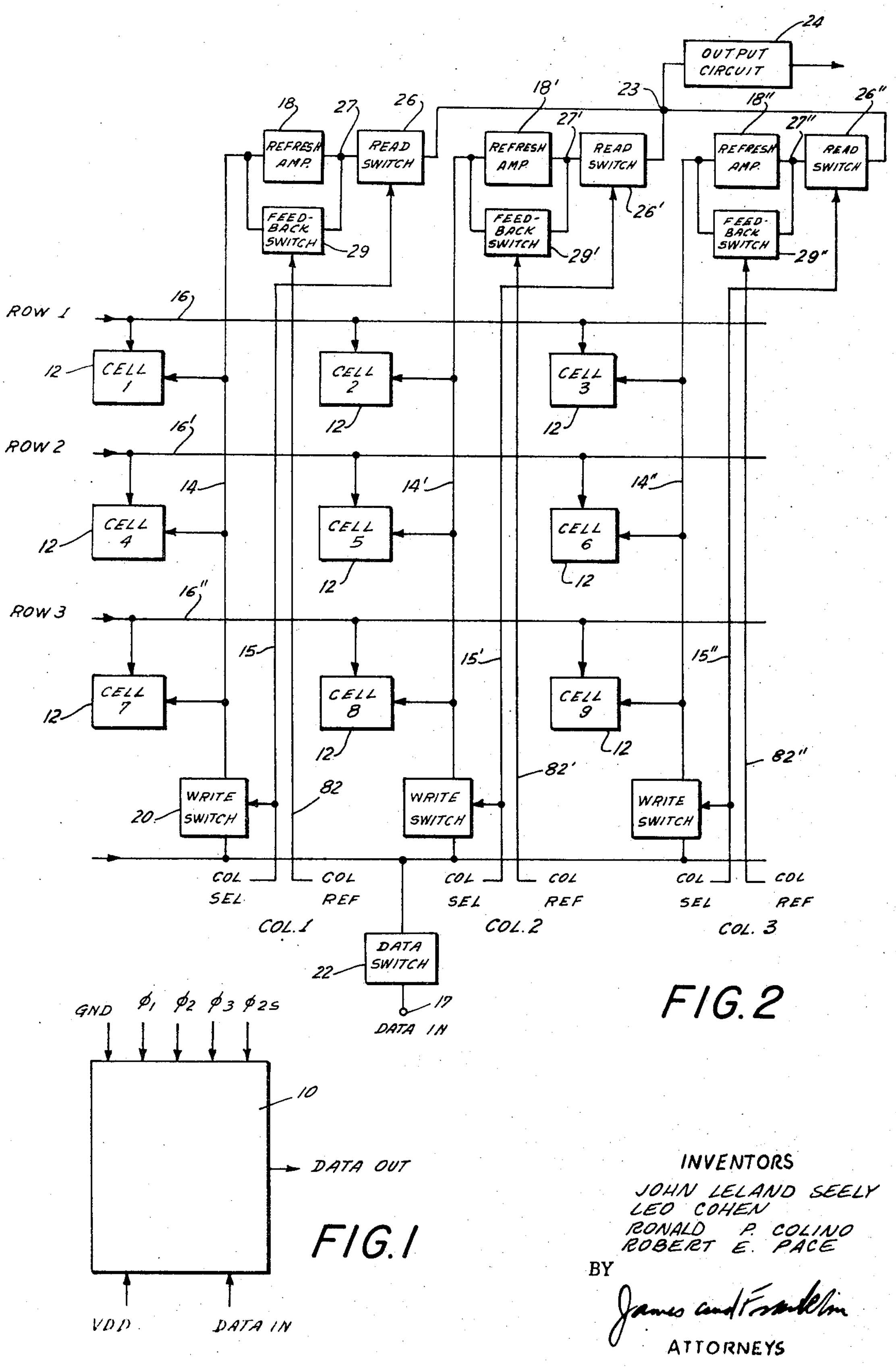
FIG. 1 is a schematic diagram of the memory system of the present invention indicating the input signals to the system.
FIG. 2 is a schematic block diagram illustrating the row and column arrangement of the memory cells of the memory system of FIG. 1 and the mode of data input, data output and data refreshing utilized therein.

As schematically illustrated in FIG. 1, chip 10 receives the clock signals, operating voltages and data input signals at suitable input terminals. The sequential row and column select signals as well as the various other timed signals utilized in the circuitry as hereinafter described are internally derived by circuitry incorporated within chip 10. For a system comprising a plurality of such chips, each chip in the system may also receive a sequential input chip select signal.

Referring now to FIG. 2, the memory or delay system is particularly described herein, purely by way of illustration, as comprising 9 memory cells 12 arranged in a plurality of intersecting rows and columns, there being three rows and three columns respectively forming at their intersections the addresses at which each of the memory cells 12 are located. It will of course be appreciated that any desired number of cells located at the intersections of any desired number of rows and columns may be provided depending upon the desired storage capacity and the available space and power. The memory cells in a given column are each operatively connected to a column data line 14 and a column select line 15 and each of the memory cells in a given row is operatively connected to a row select line 16. (Throughout this specification, reference numerals associated with the first row and column will be unprimed, and the like elements associated with the second and third rows and columns will be primed and double primed, respectively. The unprimed reference numeral will be utilized when referring to an element in general). For the reading of data stored at a given address or the writing of a new data signal at said address, the signals at the input row and column select lines associated with that address must be uniquely negative. Thus for performing a read or write operation at the address defined by the intersection of row 1 and column 1 the row 1 select signal at line 16 and the column 1 select signal at line 15 must be uniquely negative, all other row and column select signals being at ground potential.

A refresh amplifier 18 is operatively connected to each column line 14 and is effective to refresh the data at the addressed memory cell in that column. In accordance with the present system refresh amplifier 18 is adapted to restore and enhance the signal level of the signal appearing at its associated column data line 14 during each cycle except during the period in which that column is being addressed.

Each column data line 14 is operatively connected at one end to the data input terminal 17 through a column write switch 20 associated with each column and a common data input switch 22 operatively connected to all column data lines in series with column write switches 20. Each column line 14 is operatively connected at its other end to the input node 23 of a common output circuit 24 through a column read switch 26 operatively connected to each refresh amplifier 18. The column select line 15 associated with each column controls both the column read and column write switches and receives the sequential column select signals generated in a manner hereinafter described. Row select lines 16 receive the sequential row select signals.

Figure 3:
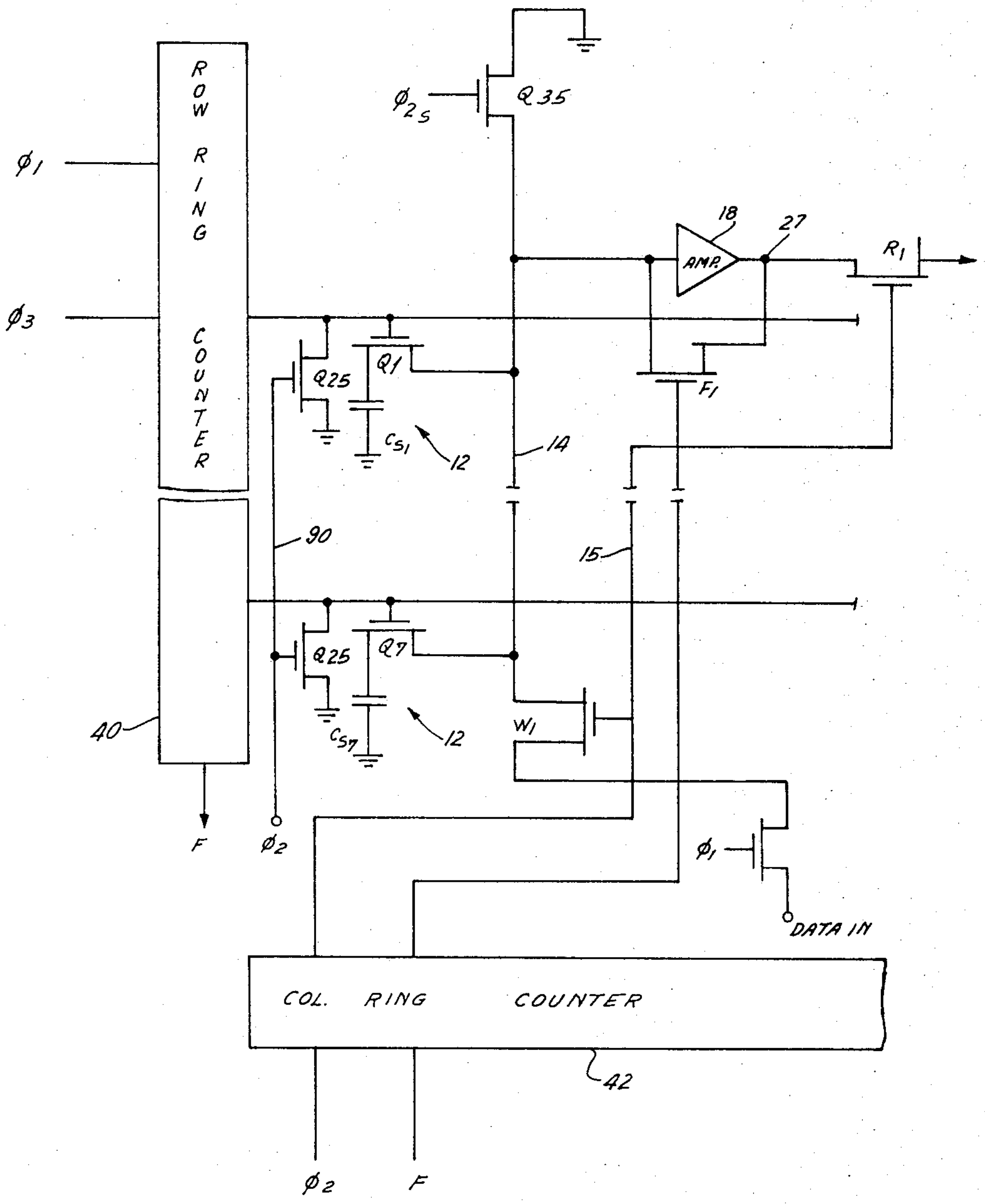
FIG. 3 is a schematic circuit diagram of one column of the memory system of FIG. 2 schematically illustrating the sequential row and column address means.
Figure 4A:
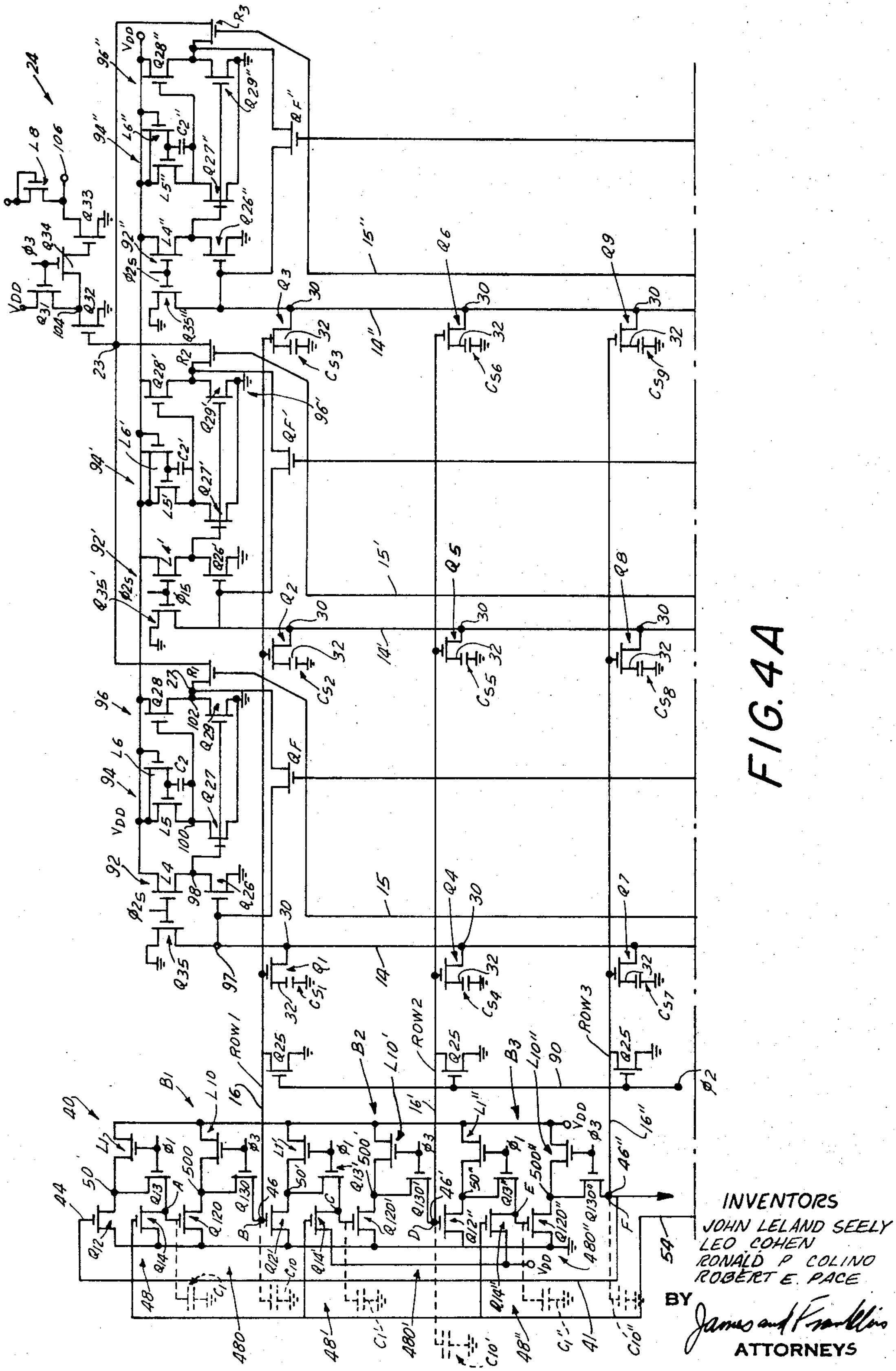
FIGS. 4A and 4B are schematic circuit diagrams which together illustrate a 9-bit memory or delay system in accordance with the present invention.

As best shown in FIG. 3 memory cells 12 each comprise a single switching device in the form of a field effect transistor having a pair of output terminals designated the source and drain, and a control or gate terminal. As shown in FIG. 4A, the FETs in row 1 are designated Q1, Q2 and Q3, the FETs in row 2 are designated Q4, Q5 and Q6 and the FETs in row 3 are designated Q7, Q8 and Q9. One of the output terminals of each FET is connected at node 30 to its column data line 14, and its other output terminal is connected to one terminal of a data storage element, preferably in the form of a data storage capacitor Cs (the capacitors associated with FETs Q1–Q9 are designated *Cs*—*Cs*9, respectively), the other side of which is grounded. The row select signal is applied at row select line 16 directly to the gate terminals of the FETs in that row, so that if a cell is in the selected row a negative signal is applied to the gate of its memory FET thereby to close the output circuit path between its output terminals to transfer the stored data signal from the data storage capacitor *Cs* to node 30. A plurality of such memory cells in each column, corresponding to the number of rows in the memory, have their output circuits connected to each column data line 14. Thus the output circuits of FETs Q1, Q4 and Q7 are connected to the column data line of column 1, the output circuits of FETs Q2, Q5 and Q8 are connected to the column 2 column data line and the output circuits of FETs Q3, Q6 and Q9 are connected to the column 3 column data line.

The data signal stored on capacitor *Cs* is at one of two discrete voltage levels corresponding to either the logic "1" or the logic "0" condition. For the particular circuit described herein, a logic "0" condition is assumed to be established when a signal of substantially zero volts or ground is stored on terminal 32 of the data storage capacitor Cs, and a logic "1" condition is assumed when the signal level on terminal 32 of that capacitor is equal to or more than negative than −6 volts.

Figures 4B, 4C:
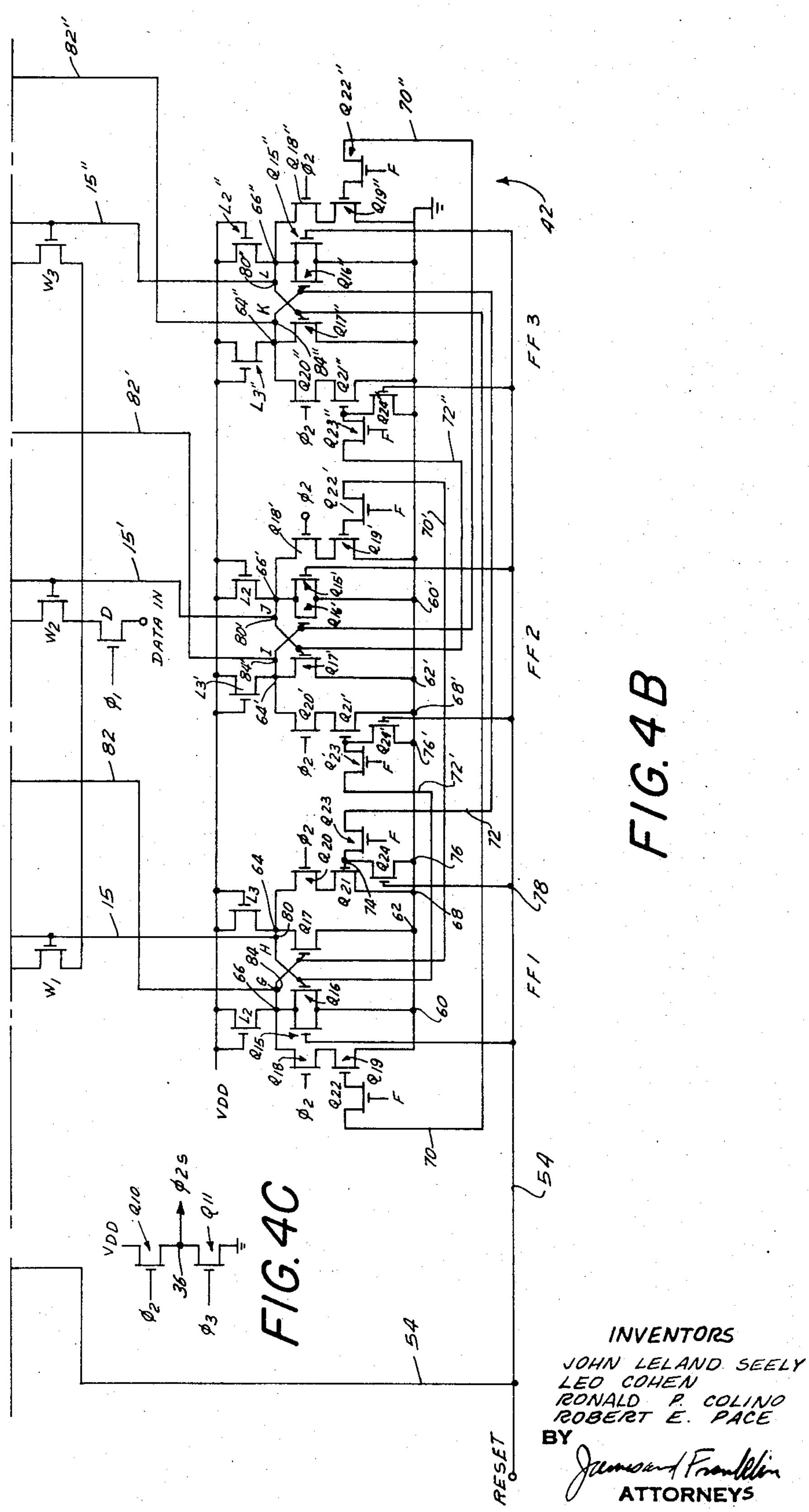
FIG. 4C is a circuit diagram of a clock generating circuit.
Figure 5:
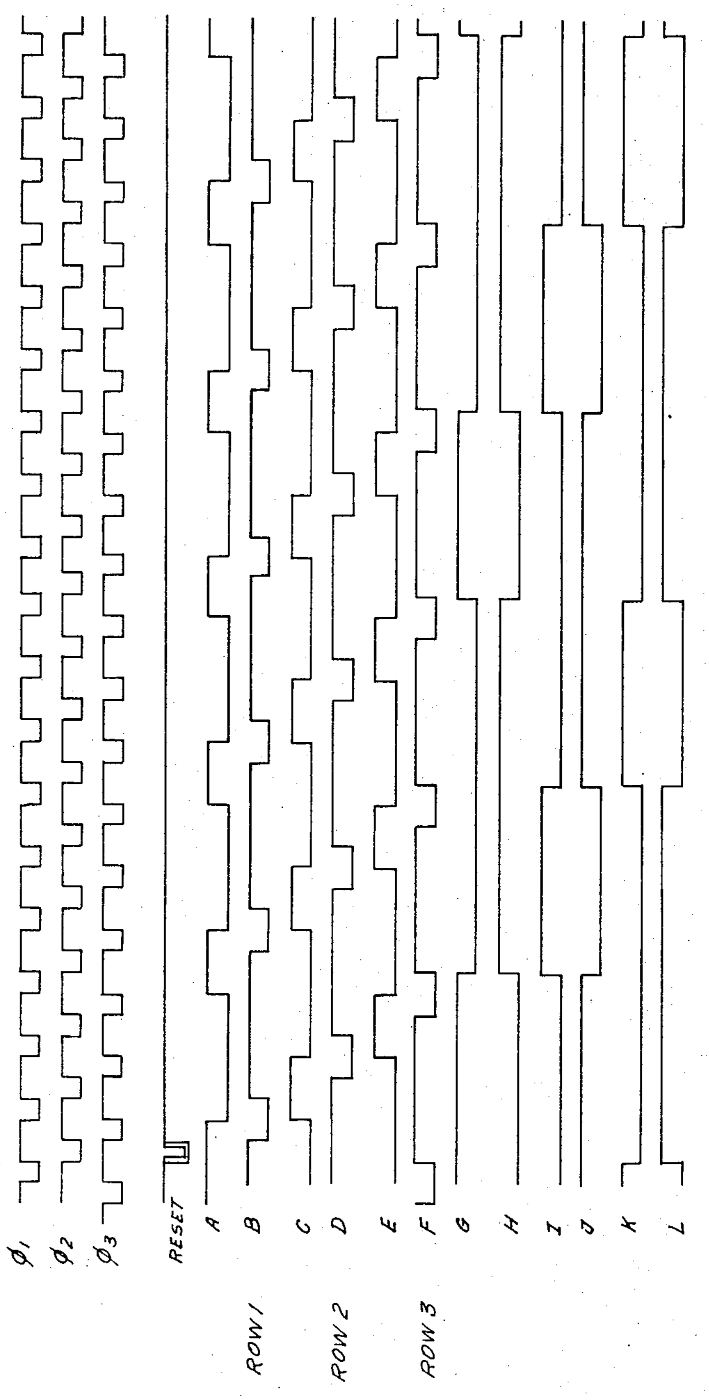
FIG. 5 is a timing diagram illustrating the time relationships between the various clock and clock derived signals utilized in the operation of the system of FIGS. 4A and 4B.

The timing signals which control the operation of the memory, refreshing, and addressing circuits of the memory system are shown in FIG. 5 and comprise three unique clock phases, 01, 02, and 03. These signals are normally at ground level and are negative during their respective portion of a clock cycle at a level equal to the −24 volt level of the $V_{DD}$ supply. The negative portion of each clock phase is referred to as the "time" of that phase, that is "02 time" is the period during a clock cycle in which the 02 clock phase is negative. A fourth clock phase designated 02s is derived from clock phases 02 and 03, respectively, by means of the clock generating circuit illustrated in FIG. 4C.

As there shown, the circuit comprises two switching devices, FET Q10 and FET Q11, having their output circuits connected in series between the $V_{DD}$ supply and ground. FET Q10 functions as a load resistor and has a relatively high output resistance of approximately 33 k.ohms and receives at its gate terminal the 02 clock phase. FET Q3 is a low resistance high speed switching device having a resistance of a magnitude considerably smaller than load resistor FET Q10 and receives at its gate terminal the 03 clock signal. Accordingly, during 02 time node 36 between FETs Q10 and Q11 is charged negative by the $V_{DD}$ supply through the closed circuit of load resistor FET Q10. As a result the negative going edge of the 02s output is slightly delayed relative to the negative going edge of 02. During 03 time, FET Q11 is rendered conductive and FET Q10 is rendered nonconductive thereby to discharge the 02s output to ground. Because of the relative values of resistance of FETs Q10 and Q11, the positive going edge of 02s is much faster reacting (less delayed). Consequently, 02s time begins slightly after the commencement of 02 time and terminates substantially simultaneously with the onset of 03 time. The desirability of this pulse configuration will become apparent hereinafter.

As will hereinafter be described with reference to the address circuitry of FIGS, 4A and 4B, row and column select signals are sequentially applied to the memory cells 12 during each entire clock cycle, the addressing of a particular row beginning at the onset of 03 time and terminating at the onset of the next 03 time. As previously noted, the application of a unique negative row select signal to a row select line is effective to close the circuit paths between the memory cells in that row and their respective column lines.

Accordingly, in order to avoid the presence of signal levels from previous row address operations on column lines 14, all column lines must be discharged during 02s time to the logic "0" or ground level. To this end FETs Q35 are provided between each column line 14 and ground and receive the 02s clock signal at their gate terminals. Thus, during 02s time all column lines are discharged through the output circuits of FETs Q35 which are turned on during 02s time. However, if the signal at the selected row line were to remain negative during this time any logic "1" signals stored in the memory cells of that row would be destroyed as a result of the discharge path through the conductive output circuits of their memory FETs and discharge FET Q35. Consequently all memory FETs must be rendered non-conductive prior to the discharge operation during 02s time. To this end a FET Q25 is connected between each row line 16 and ground and is adapted at the onset of 02 time to discharge all row lines as a result of the 02 clock phase applied to their gate terminals via line 90. As a result of the relative (time delayed) pulse configurations of 02 and 02s the memory FETs are effectively turned "off" prior to the grounding of column lines 14, thereby to insure the integrity of the data signal levels stored in the memory cells of the selected row.

For a read operation, when the uniquely negative row select signal is applied to the gate of each memory cell in the selected row, the stored data at each data storing capacitor Cs in that row is transferred through the respective output circuits of the FETs in that row to cause a redistribution of the voltage between the capacitor C*s* and the pre-discharged column line 14. The column lines 14 in turn constitute the inputs to the refresh amplifiers 18. As will be hereinafter described, the signal level subsequently appearing at the refresh amplifier output node corresponds to the stored data level on the storing capacitor C*s* in the selected row at an enhanced signal level. As best shown in FIG. 2 that signal is applied to the read switch 26 which is in turn controlled by the column select signal applied to the column select line 28.

For the memory cell in the selected column, that column select line 15 receives a uniquely negative column select signal thereby to render its associated read switch 26 conductive. Accordingly, the reconstituted stored data signal at the output node 27 of refresh amplifier 18 is operatively connected to the input node 23 of output circuit 24. The stored data signal in the selected memory cell is processed in output circuit 24 and appears at the output of output circuit 24 at an enhanced signal level. The feedback switch 29 of the refresh amplifiers 18 in the unselected columns are rendered conductive and connect the output nodes 27 to the column lines 14 and thus to the data storing capacitor C*s* of the unselected cell through the still conducting FETs associated with those cells. As the signal at output node 27 represents the initially stored logic signals at the data storing capacitors C*s*, the signal applied to that capacitor from node 27 is effective to reestablish or refresh the data signal thereat. Data refreshing of this nature is required because the operative connection of capacitors C*s* to its associated column line 14 through the output circuit of its operative FET has the effect of "destroying" the data level originally stored at that storing capacitor C*s* as a result of the voltage redistribution between capacitor C*s* and column line 14.

For a write operation, a new data signal is directed into and stored within the data storing capacitor of the selected memory cell utilizing the same addressing system hereinafter to be described. Thus the uniquely negative column select signal at the column select line 15 is effective to render write switch 20 conductive. The data input signal applied to the data input terminal 17 is transmitted through the clocked data input switch 22 (shown in FIG. 3 as FET D) and the conductive write switch 20 to the selected column line 14. When the uniquely negative row select signal is applied to the gate of the selected memory cell the data signal is thus transferred to and impressed upon the storing capacitor Cs of that cell through its associated conductive FET.

As shown in FIG. 3, read switch 26, write switch 20 and feedback switch 29 are in the form of field effect transistors designated as FETs R, W, and F, respectively, the subscript indicating the column with which they are associated.

ADDRESS CIRCUITRY

As best illustrated in FIG. 3 all rows and columns are addressed in a predetermined timed sequence by means of row and column ring counters generally designated 40 and 42.

ROW RING COUNTER

Row ring counter 40 is best shown in FIG. 4 (at the left-hand side thereof) and comprises a conventional two-phase MOS shift register having a feedback connection 41 between its output node and its input node.

In a dynamic shift register of this type each stage receives clock pulses which are effective on each clock pulse cycle to shift or transfer data from one stage to a succeeding stage. In accordance with the present invention one bit of the register is required for each row of memory cells. Thus, in FIG. 4 there is illustrated a register having 3 bits, generally designated B1, B2 and B3 associated with row 1, row 2 and row 3 respectively. Each bit comprises an input port 44 and an output port 46 between which are connected in series a pair of identical inverter stages generally designated 48 and 480. Since the inverter stages are identical, only inverter stage 48 will be described in detail. Inverter stage 48 comprises a load FET L1 and a low impedance switching FET Q12 connected in series across reference voltage source $V_{DD}$ and ground.

The gate terminal of the load FET L1 is impressed with the 01 clock signal and the gate terminal of FET Q12 is connected to the data input port 44 and is adapted to receive the data input signal. A second switching device FET Q13 is connected between a node 50 formed at the junction of the output circuits FETs L1 and Q12 and an inverter node designated A. The gate terminal of FET Q13 is also impressed with the 01 clock signal.

FETs Q12 and Q13 are typical low resistance switching FETs, i.e., their "on" impedances are extremely low and are equivalent for most purposes to an open circuit. The load FET L1, on the other hand, is a rather high resistance device typically having an "on" impedance of at least 10 times that of switching FETs Q12 and Q13.

During 01 time FETs L1 and Q13 are rendered conductive by the application of the 01 clock pulse to their gate terminals. If the input data signal at input port 44 is positive (logic "0"), FET Q12 will be rendered non-conductive and inverter node A will be charged negative by the $V_{DD}$ voltage source through conductive FETs L1 and Q13. If, however, the input data signal at input port 44 is negative (logic "1") FET Q12 will be rendered conductive, thereby providing a discharge path through the output circuits of FETs L1 and Q12 across voltage source $V_{DD}$. Accordingly, by virtue of the voltage divider action of high resistance FET L1 and low resistance FET Q12, the voltage at junction node 50 will be close to ground and inverter node A will be left at a logic "0" level regardless of the charge level remaining thereon from a previous cycle. Thus, if inverter node A is initially at logic "0" it will remain at such level since the charging path has been shorted through FET Q12. If inverter node A is initially at logic "1" it will be discharged during 01 time through FETs Q13 and Q12. The necessity of designing L1 as a relatively high resistance device will now become apparent. In the event of a logic "1" signal at input port 44 the voltage at node 50 is a function of the impedance ratio of FET L1 to FET Q12, the higher such ratio the closer node 50 is drawn to ground. The 10:1 impedance ratio here employed insures that when the data input signal is negative the voltage level at node 50 and thus at inverter node A will be insufficient to render the input FET Q120 of the next inverter stage conductive, that is, when the data input signal is at logic "1, " the signal at inverter node A will be at logic "0." The signal at inverter node A is stored on capacitor C1 here indicated in broken lines and representing the combined effects of the interelectrode capacitances of FETs Q13 and Q120. During 03 time the signal stored on capacitor C1 is again processed in like manner through inverter stage 480 and the complement thereof appears at output port 46, the operative node thereof being designated B. Thus, if the signal stored on capacitor C1 at the end of 01 time is negative (logic "1"), the $V_{DD}$ voltage source will be discharged through conductive FETs L10 and Q120, the signal at junction node 500 and output port 46 being drawn to a logic "0" level. If the signal stored on capacitor C1 was positive (logic "0") at the end of 01 time then output port 46 will be charged negative by supply voltage $V_{DD}$ through conductive FETs L10 and Q130 during 03 time, junction node 500 and output port 46 being effectively isolated from ground by nonconductive FET Q120. It will be apparent that the data input signal at input port 44 will be twice inverted during one clock cycle and will be reconstituted at output port 46 after a 1 bit or a one cycle delay.

Shift register bits B1–B3 are connected serially to form a 3 bit register. (Like elements in bits B2 and B3 are designated by like reference numerals with the addition of a prime and double prime, respectively. For convenience the operative nodes are designated by letters A–F.) Thus, the output node B of Bit B1 is connected to the input gate terminal of input FET Q12' of bit B2 and the output node D of bit B2 is connected to the input gate terminal of input FET Q12'' of bit B3. Feedback line 41 is effective to connect the output signal at output node F of bit B3 to the input gate terminal 44 of input FET Q12 of bit B1. Accordingly, if a logic "1" signal is applied at the input node of any bit it will be transfered successively during each clock pulse cycle to the following bit in an endless path, for example from bit B1 to bit B2 to bit B3 and thence via feedback line 41 back to bit B1.

To initiate this process there is provided a reset FET Q14 associated with each bit. Reset FET Q14 of bit B1 has its output circuit connected between the inverter node A and ground. The reset FETs Q14 associated with bits B2 and B3 have their output circuits connected between the inverter nodes C and E of their respective bits and the $V_{DD}$ voltage source. FETs Q14 are controlled at their gate terminals by a common reset signal applied thereto via line 54. Thus upon application of a negative or logic "1 " reset signal to line 54, and reset FETs Q14 are all rendered conductive whereby the inverter node A and capacitor C1 of bit B1 is discharged to ground or a logic "0" level and inverter nodes C and E and capacitors C1' and C1'' of bits B2 and B3, respectively, are charged to the negative $V_{DD}$ or logic "1" level. Accordingly, FET Q120 of bit B1 is rendered nonconductive and node 500 is isolated from ground. Conversely, nodes 500' and 500'' of bits B2 and B3 are both discharged to ground via their FETs Q120' and Q120'' which have been rendered conductive. Thus, the output node B and capacitor C10 of bit B1 are charged to the negative $V_{DD}$ level via conductive FETs L10 and Q130 and node 500 which is still isolated from ground. On the other hand, the charging path to output nodes D and F of bits B2 and B3 are shorted to ground via their still conducting FETs Q120' and Q120'' and these nodes (D and F) are discharged to ground. Consequently only the output B of bit B1 will be at logic "1" at the termination of 03 time, the outputs D and F of the remaining bits being discharged to the logic "0" level.

It will be apparent that the logic "1" reset signal impressed on lines 54 need only last for an interval sufficient to discharge inverter node A of bit B1 to logic "0" and to charge the inverter nodes C and E of the remaining bits B2 and B3 to the logic "1" level. These nodes will remain at these logic levels after the termination of the reset signal until a charging path is established from the $V_{DD}$ voltage source. This will next occur during $\overline{01}$ when the signal at node 50 of the same bits is at the opposite polarity. Thus, during 01 time node A will be charged to the $V_{DD}$ level via conductive FETs L1 and Q13, this charging path being isolated from ground as a result of the logic "0" signal transferred from the output F of bit B3 to the input gate terminal 44 of FET Q12 of bit B1. In a like manner inverter node E of bit B3 will be charged (or rather remain charged) to the logic "1" level via its conductive FETs L1'' and Q13'', this charging path being isolated from ground as a result of the logic "0" previously transferred from the output D of bit B2 to the input gate terminal 44 of bit B3. However, during 01 time the inverter node C of bit B2 is now discharged to ground through FET Q12 (from its previous logic "1" condition) as a result of the previous transfer of the logic "1" output B from bit B1 to the input gate terminal 44 of FET Q12 of bit B2.

It will be appreciated that once reset, the shift register will, in the above described manner, continue to transfer a logic "1" signal from one bit to the next during each complete clock cycle. Thus during a clock cycle only one bit will have its output node at logic "1" and during the next clock cycle, the output node of the next bit will be uniquely at logic "1," and so on ad infinitum.

Each row line is connected to an output node of a bit of the shift register. Thus row 1 is connected to the output node B of bit B1, row 2 is connected to the output node D of bit B2 and row 3 is connected to the output node F of bit B3. Consequently rows 1, 2 and 3 are addressed in sequence by a unique logic "1" signal at a frequency of one complete clock cycle of the register, three clock cycles being required to complete a row address cycle. This process is shown schematically by the timing diagram of FIG. 5.

Each time a row is addressed all of the memory FETs in that row are rendered conductive whereby the signal stored thereat may be read out or a new signal may be read in. However, a "read" or "write" operation is performed upon only one of the memory cells in the selected row-- i.e. the cell in the selected column. To this end a unique logic "1" column select signal is applied only to the read and write switches 20 and 26 controlled by the column select line of the selected column thereby to perform a read or write operation only on the memory cell at the selected address. The column select signals are applied to the column select lines 15 in timed sequence at intervals of one complete row address cycle by the column ring counter 42.

COLUMN RING COUNTER

Ring counter 42 comprises a plurality of bistable flip-flop, circuits, one flip-flop circuit being provided for each column. Accordingly three such circuits are illustrated in FIG.4B. The column 1 circuit is designated FF1, the column 2 circuit is designated FF2 and the column 3 circuit is designated FF3. Since the circuits are substantially identical only the first circuit FF1 will be specifically described, the elements of the remaining circuits being designated by like reference numerals with the addition of a prime and double prime, respectively. (Again the operative nodes are designated by letters.) Each circuit comprises a pair of load FETs L2 and L3 having their gate and drain terminals connected to the $V_{DD}$ supply. FET L2 is connected in series with a pair of parallel connected FETs Q15 and Q16 having their source terminals grounded at node 60. FET L3 is connected in series with FET Q17 which has its source terminal grounded at node 62. FETs Q16 and Q17 are cross coupled — the gate terminal of FET Q16 is connected to the junction node 64 between the output circuits of FETs L3 and Q17 and the gate terminal of FET Q17 is connected to the junction node 66 between the output circuits of FETs L2 and FETs Q15 and Q16. A pair of FETs Q18 and Q19 have their output circuits connected in series between node 66 and ground. A second pair of FETs Q20 and Q21 have their output circuits connected in series between junction node 64 and ground at node 68. FETs Q18 and Q20 are both controlled at their gate terminals by the 02 clock signal. The gate terminal of FET Q19 is connected to a coupling line 70 via a switching FET Q22 which is controlled at its gate terminal by the output signal F from bit B3 of ring counter 40. The gate terminal of FET Q21 is connected to a second coupling line 72 via another switching FET Q23 also controlled at its gate terminal by the output signal F. A reset FET Q24 has its output circuit connected between the gate of FET Q21 and ground at nodes 74 and 76, respectively, and has its gate terminal connected to reset line 54 at node 78. The two output signals at nodes 66 and 64 are designated G and H, respectively. Output signal H is the column select signal for column 1 and is coupled to the column select line 15 at node 80. Output signal G controls the feedback switch of the refresh amplifier 18 in column 1 and is coupled thereto via a column refresh line 82 at node 84.

Circuits FF2 and FF3 are identical to circuit FF1 with the exception that the output connections are reversed. Thus, the column select lines 15' and 15'' are connected to output column select signals J and L (nodes 66' and 66'') at nodes 80' and 80'', respectively, and the column refresh lines 82' and 82'' are connected to the output refresh signals I and K (nodes 64' and 64'') at nodes 84' and 84'', respectively. (For convenience, the layout of these circuits has been correspondingly reversed.)

The coupling lines 72, 72' and 72'' of circuits FF1, FF2 and FF3 are each connected to an output of the previous stage. Thus line 72 is connected to column refresh signal K of FF3, line 72' is connected to column select signal H of FF1 and line 72'' is connected to column select signal J of FF3. Likewise, coupling lines 70, 70' and 70'' are connected to the column select line L of circuit FF1 and column refresh signals G and I of circuits FF2 and FF1, respectively.

The operation of ring counter 42 will now be described by reference to the timing diagram of FIG. 5. Assuming a negative reset signal during 02 applied to reset line 54, FETs Q15, Q15', Q15'', Q24, Q24' and Q24'' are all rendered conductive. Accordingly the output signals G, J and L at nodes 66, 66' and 66'' are all drawn to ground or logic "0" via conductive FETs Q15, Q15' and Q15'', respectively. Simultaneously, the gate terminals of FETs Q21, Q21' and Q21'' are all drawn to ground via conductive FETs Q24, Q24' and Q24'', respectively, thereby to render those FETs non-conductive and to isolate nodes 64, 64' and 64'' from grounded nodes 68, 68' and 68'', respectively. In addition FETs Q17, Q17' and Q17'' are rendered nonconductive by the logic "0" output signals G, J and L at nodes 66, 66' and 66'', respectively, thereby to isolate nodes 64, 64' and 64'' from grounded nodes 62, 62' and 62'', respectively. As a result nodes 64, 64' and 64'' are charged negative via load FETs L3, L3' and L3'' and output signals H. I and K are at logic "1." The reset signal at line 54 need only be of a duration sufficient to discharge the operative nodes as described, and normally will be terminated prior to 03 time.

It will be appreciated that the output signals G, H. I, J, K, and L are now D.C. stable and will remain in their respective logic conditions until the output signal F of the last bit B3 of ring counter 40 goes negative.

During 03 time, as previously described, a logic "1" signal will be transferred to output node B of bit B1 of ring counter 40 and memory FETs Q1, Q2 and Q3 in row 1 will be rendered conductive. However, only column select line 15 of column 1 is at logic 1 and thus only read FET R1 and Write FET W1 are rendered conductive. Memory cell 1 at row 1, column 1 is now ready for a "read" or "write" operation. The remaining memory cells 2 and 3 in row 1 defined by memory FETs Q2 and Q3 are refreshed at this time via refresh amplifier 18, in a manner to be described hereinafter, the output signal at the output of amplifiers 18' and 18'' being fed back to column lines 14' and 14'', respectively, via now conductive feedback FETs F2 and F3.

During 01 time of the next clock cycle, data FET D is rendered conductive and data may be read into storage capacitor Cs1 via column line 14 and conductive FETs W1 and Q1. Alternatively, the signal at the output of refresh amplifier 18 which is the reconstituted version of the signal stored at capacitor Cs1 may be read out of the memory via conductive read FET R1 and output circuit 24 (described hereinbelow). It will be noted that column lines 14′ and 14″ remain isolated from the input data signal by nonconductive write FETs W2 and W3 and from the output circuit 24 by nonconductive read FETs R2 and R3.

The above process continues for two successive clock cycles during which the row lines of rows 2 and 3 are successively addressed whereby the FETs in those rows receive the uniquely negative row select signal at their gate terminals, in a manner already described, and as shown in the timing diagram of FIG. 5.

When the last row select signal F goes negative at the onset of 03 time, FETs Q22, Q24, Q22′, Q24′, Q22″ and Q24″ are all rendered conductive. Consequently the logic "1" outputs H, I and K are effective via conductive FETs Q23′, Q22″ and Q23, respectively, to charge the gate terminals of FETs Q21′, Q19″ and Q21, respectively, thereby to render those FETs conductive.

During 01 time of the next clock cycle data is either written into or read out from the memory cell 7 defined by memory FET Q7. At the onset of 02 time FETs Q18, Q18′, Q18″, Q20, Q20′ and Q20″ are again rendered conductive—node 64 is discharged to ground via conductive FETs Q20 and Q21 and node 64′ is discharged to ground via conductive FETs Q20′ and Q21′. As a result flip-flop circuit FF1 toggles—output H goes to logic "0," FET Q16 is rendered nonconductive and output G goes to logic "1," nonconductive FET Q19 maintaining node 66 (output G) isolated from ground —, and flip-flop circuit FF2 toggles—output I goes to logic "0," FET Q16′ is rendered nonconductive and output J goes to logic "1," nonconductive FET Q19′ maintaining node 66′ (output J) isolated from ground.

At the same time (02 time) output (row select) signal F goes to logic "0," as a result of the discharge of row 3 via FET Q25. Consequently the gate of FET Q21″ is isolated from the negative going output signal J (coupling line 72″) by nonconductive FET Q23″. As a result FET Q21″ remains nonconductive, output signal K at node 64″ is maintained at logic "1," and column select signal L remains at logic "0."

This logic condition of nodes G–L again remains until the end of the next row address cycle when during F02 time (when signals F and 02 are both negative) flip-flop circuits FF2 and FF3 toggle, thereby to transfer the unique negative column select signal to column select line 15″ of column 3. The above process continues whereby the columns are addressed sequentially at a frequency of one complete row address cycle, each row being addressed in sequence between toggles. One complete address cycle is illustrated in the following truth table:

| | FF1 | | FF2 | | FF3 | |
|---|---|---|---|---|---|---|
| | 82 | 15 | 82′ | 15′ | 82′ | 15″ |
| | G | H | I | J | K | L |
| Reset | 0 | 1 | 1 | 0 | 1 | 0 |
| $\overline{F}$02 | 0 | 1 | 1 | 0 | 1 | 0 |
| F02 | 1 | 0 | 0 | 1 | 1 | 0 |
| $\overline{F}$02 | 1 | 0 | 0 | 1 | 1 | 0 |
| F02 | 1 | 0 | 1 | 0 | 0 | 1 |
| $\overline{F}$02 | 1 | 0 | 1 | 0 | 0 | 1 |
| F02 | 0 | 1 | 1 | 0 | 1 | 0 |

REFRESH AMPLIFIER

It will be recalled that each time a row is addressed by a unique logic "1" signal all memory FETs in that row are rendered conductive whereby the signal stored on the storage capacitors Cs in the memory cells of that row are connected to their respective column lines 14, 14′ and 14″. As a result there is a redistribution of the charge between the capacitor Cs and the predischarged column lines 14–14′. Accordingly, refresh amplifier 18 is required to have the capability of responding quickly to the nature of the stored logic signal after it has been connected to its respective column line, and to produce a refresh signal at its output which is an intensified version of that stored logic signal, so as to unambiguously and rapidly re-establish the logic level of the data stored on capacitors C*s*.

The amplifier 18 of this invention having these operating characteristics comprises an input inverter stage generally designated 92, a driver stage generally designated 94 and a push-pull amplifier stage generally designated 96. Inverter stage 92 comprises a load FET L4 connected in series with a switching FET Q26 between the $V_{DD}$ voltage source and ground. Load FET L4 is controlled at its gate terminal by the 02s clock signal and is effective to precharge node 98 at the junction between FETs L4 and Q26, negative during 02s time. Switching FET Q26 is connected at its gate terminal to column line 14 at node 97 and during 02s time is nonconductive as a result of the discharge path through FET Q35. Accordingly, if the data stored on the storage capacitor Cs in the selected row is at logic "1," FET Q26 will be rendered conductive during 03 time thereby to discharge the junction node 98. Conversely if the data stored in the memory cell in the selected row is at logic "0" the signal level on column line 14 will be insufficient to render FET Q26 conductive and junction node 98 will remain charged negative. Driving stage 94 comprises a pair of load FETs L5 and L6 each having one output terminal connected to the $V_{DD}$ supply voltage. FET L6 has its gate terminal returned to the $V_{DD}$ supply and its other output terminal connected to the gate of FET L5. FET L5 is connected in series with a switching FET Q27 which is controlled at its gate terminal by the output of inverter stage 92 at node 98 and has its source terminal connected to ground. A capacitor C2 is connected between the gate and source terminals of load FET L5.

In operation if a negative logic "1" signal is applied to the gate of FET Q27 the output at junction node 100 is grounded via conductive FET Q27. Load FET L6 is held on because its gate terminal is connected to the $V_{DD}$ supply and therefore is at least one threshold more negative than its source terminal. During the interval of time that FET Q27 is conductive capacitor C2 is charged to a magnitude one threshold level less than the $V_{DD}$ supply. When the capacitor is fully charged FET L6 is rendered nonconductive thereby to place a high resistive path between the capacitor C2 and the $V_{DD}$ supply.

When node 98 goes to logic "0" (a logic "1" output from the memory cell in the selected row), FET Q27 is rendered nonconductive and node 100 is charged negative via conductive FET L5. The output at node 100 is fed back to the gate electrode of FET L5 via capacitor C2, driving the gate more negative. As a result of the initial charge on capacitor C2, this self-biasing or bootstrap arrangement is effective to drive the gate terminal of FET L5 to a voltage substantially more negative than the output, thereby to charge the output at node 100 to the full $V_{DD}$ supply level.

Push-pull stage 96 comprises a pair of high speed switching FETs Q28 and Q29 connected in series between the $V_{DD}$ supply and ground, the output 27 being taken off junction node 102. FET Q28 is controlled at its gate terminal by the signal at node 100 and FET Q29 is controlled at its gate terminal by the signal at node 98. Consequently a logic "0" output at node 98 is effective to turn off FET Q29 and to turn on FET Q28, thereby to charge output node 102 negative. Conversely, a logic "1" output at node 98 turns FET Q28 "off" and turns FET Q29 "on" thereby to discharge output node 102 to ground. Because FET Q28 is controlled by the logic at node 100 it may be a low resistance high speed switching FET resulting in a rapid charge of node 102.

Feedback FET F1 is connected between output node 102 and input node 97 and has its control terminal connected to node G of flip-flop circuit FF1 via refresh line 82. It will be seen from the timing diagram of FIG. 5 that the refresh signals generated at nodes G, I and K are always the complements of column select signals H, J and L, respectively. Consequently, the feedback circuits of the refresh amplifiers in all unselected rows are maintained closed thereby to rapidly feed back an enhanced version of the output signal at column line 14 during each clock cycle (at the onset of 03 time). In order to allow a write operation, however, the memory cells in the selected column are not refreshed during one row address cycle because of the open feedback path resulting from the open circuit of its feedback FET which is rendered nonconductive.

OUTPUT CIRCUITRY

The outputs of all amplifiers 18–18″ are connected to the input node 23 of output circuit 24. Output circuit 24 is a double inverter and compresses a first pair of FETs Q31 and Q32 connected in series between the $V_{DD}$ supply and ground, a second pair of FETs L8 and Q33 also connected between the $V_{DD}$ supply and ground, and a transfer FET Q34 connected between node 104 at the junction of FETs Q31 and Q32 and the gate terminal of FET Q33. The gates of FETs Q31 and Q34 are both controlled by the 03 clock phase and the gate of load FET L8 is returned to the $V_{DD}$ supply. The gate of FET Q38 is connected to the amplifier outputs at node 23.

In operation, during 03 time, FETs Q31 and Q34 are rendered conductive. If the input data at node 23 is at logic "1," the gate of FET Q33 will be discharged via conductive FET Q32 and the output at node 106 will be charged negative via load FET L8. If the input goes to logic "0," FET Q32 is rendered nonconductive and the gate of FET Q33 is charged negative via conductive FETs Q31 and Q34. As a result the output is discharged to ground via conductive FET Q33.

SUMMARY

The overall operation of the memory or delay circuit of the present invention will now be appreciated. Column select ring counter 42 is effective to address each column in sequence at the rate of three clock cycles or one row address cycle per column. For the selected column the column select signal at column select line 15 is uniquely negative and renders the read and write FETs R and W, respectively, conductive. The column refresh line 82 of the selected column is uniquely positive and maintains the feedback FET Q30 nonconductive thereby to isolate the output of its associated amplifier 18 from the input thereof. During 02 time all row lines are grounded via FETs Q25 whereupon all column lines 14 are also grounded via FET Q35. At the same time nodes 98 of refresh amplifier 18 in all columns are precharged negative via load FET L4. At the onset of 03 time a unique logic "1" signal appears at the selected row and all memory FETs in that row are rendered conductive. Accordingly, the logic signal on storage capacitor $C_S$ appears on column line 14, is amplified by refresh amplifier 18 and appears at the output node 102 thereof at an enhanced unambiguous logic level. For the unselected columns that signal is fed back via conductive feedback FETs F to column line 14 and thence through the conductive memory FETs in the selected row to the storage capacitor $C_S$. The output signal at node 102 of the refresh amplifier 18 in the selected column is transferred via the conductive read FET R to input node 23 of output circuit 24 and appears again at an enhanced logic level at output node 106.

At the onset of 01 time input data at the data input node may be written into the selected memory cell via conductive data FET D and the conductive write FET W in the selected column. At the onset of 02 time all row and column lines are again grounded and the cycle repeats, the unique logic "1" signal being transferred in ring counter 40 to the next row line 16. After the last row has been addressed by ring counter 40 the unique negative column select signal is shifted to the next column line by the toggling of the appropriate flip-flop circuits in ring counter 42 whereupon the memory cells in each row are again sequentially addressed by ring counter 40.

In the above manner each cell is addressed in sequence, one memory cell being addressed during each clock cycle. During 03 time of each clock cycle the stored data signal in the selected memory cell appears at the output node 106. It will be apparent therefore that the output at 106 corresponds in all respects to the output of a shift register having a corresponding number of bits. Thus for the illustrated 9 bit memory the same logic will repeat every 9 bits. The present circuit is therefore useful wherever a conventional electronic shift register would be useful either as a delay or memory device. Moreover, it will be apparent that the present circuit requires substantially less switching FETs than would be required for a conventional shift register for a given storage capacity. For example, a circuit constructed in accordance with this invention having 64 columns and 64 rows will have a storage capacity of 64 × 64 or 4,096 bits. Each row requires one bit of ring counter 40 (7 transistors) plus a transistor (Q25) for clearing that row to ground, for a total of 8 transistors per row. Accordingly, for 64 rows, 8 × 64 or 522 transistors are required. Each column requires one flip-flop circuit of ring counter 42 (12 transistors), one refresh amplifier (8 transistors), a read switch, a write switch, and a transistor Q35 for clearing that column to ground for a total of 23 transistors per column. Accordingly, for 64 columns, 23 × 64 or 1472 transistors are required. Each memory cell requires one transistor for a total of 4,096 memory transistors. The entire memory therefore requires 522 plus 1472 plus 4,096 or a total of 5,090 transistors.

By contrast a conventional two phase shift register such as utilized in ring counter 40 requires 6 transistors per bit. Accordingly, a 4,096 bit prior art shift register would require 6 × 4,096 or 24,576 transistors. Consequently, for a shift register of this size the use of the present circuit results in almost a 5-fold reduction in the number of transistors required. Moreover, since a smaller number of transistors is required for each row of the circuit of the present invention than for each column, for memories having large capacitors a larger number of rows than columns is preferred. Thus taking for example the 64 × 64 memory described above each additional row added would require only 64 memory FETs plus one bit of ring counter 40 (7 FETs) plus one clearing transistor (Q25) or 72 FETs as compared to the 6 × 64 or 384 FETs required for the addition of 64 bits to a conventional shift register, a more than 5-fold reduction.

It will be appreciated from the above that the present invention provides a memory or delay circuit which combines the increased storage capacity of a fixed address type memory system with a sequential address and refresh system thereby to provide a shift register type output and at the same time provide a drastic reduction in the number of transistors per bit required.

As a result of the fixed address arrangement and clocked addressing system, the circuit of the present invention requires substantially less power to generate the clock pulses as compared to a conventional register having a comparable storage capacity.

A refresh amplifier is operatively associated with each of the columns in the memory and provides means for restoring the data signal at the data storing element in each memory cell in the unselected columns during each cycle of operation thereby to insure that the data signal in the memory cells in the selected rows are not dissipated. The design of the refresh amplifier enables a rapid response to the level of the stored logic signal to insure rapid, reliable and accurate refreshing thereof. As a result, the present invention also provides increased data retention characteristics whereby operation at a variety of frequencies is possible.

While only a single embodiment of the present invention has herein been specifically described, it will be appreciated that many variations may be made thereto without departing from the scope of the present invention, as defined in the appended claims.

We claim:

1. A memory or delay circuit comprising a plurality of memory cells arranged respectively at the intersections of a plurality of rows and columns, each memory cell comprising a data storage element for storing a data signal at one of two discrete logic levels, address means for continuously addressing said memory cells, one memory cell at a time, in timed sequence, means responsive to said address means and effective to sense the data signal stored in the addressed memory cell and output means responsive to said addressing means and to the sensed signal for generating an output signal at one of a first or second voltage level corresponding to the logic level of said sensed signal, said output thereby reflecting the sequentially sensed data signals in said memory cells and being identical in character to the output of a shift register having N bits, where N is the number of memory cells in the system, said circuit further comprising conductive means associated with each column, a plurality of semiconductor switching devices operatively connecting said data storage elements to their respective column conductors and effective when closed to transfer said stored data signals to said column conductors, said address means comprising row address means effective to simultaneously close all memory switching devices in a given row, the memory switching devices being closed in timed sequence, row by row, at a given frequency, a plurality of read switching devices operatively connecting said column conductors to said output means, and column address means responsive to said row address means and effective to close said read switches, one at a time, in timed sequence at a frequency of $1/Nr$ of said given row address frequency where $Nr$ is the number of rows in the memory system, further comprising conductive means associated with each row and operatively connected to the memory cells in that row, said row address means comprising means to apply a unique row select signal at one of said two logic levels to each of said row conductors, one row at a time, in timed sequence, wherein said row address means comprises a ring counter comprising an $Nr$ bit shift register, means connecting the output of the last bit of said register to the input of the first bit of said register, and wherein said row conductors are connected respectively to the output nodes of said register bits, and wherein said shift register is adapted to transfer data signals from 1 bit to the next during a shift cycle defined by first and second successive clock pulses, means for operatively connecting said column conductors to a source of a first voltage level in the interval between shift cycles, thereby to clear said column conductors to said first voltage level in preparation for the next cycle and means for opening all of said memory switching devices prior to said column clearing operation.

2. The memory system of claim 1, wherein said memory switches each comprise a control terminal operatively connected to its respective row conductor said memory switches being adapted to be closed by the application of a signal at said second logic level to the control terminal thereof and being adapted to be opened by the application of a signal at said first logic level to the control terminal thereof, and wherein said means for opening all of said memory switching devices comprises means effective to operatively connect all of said row conductors to said source of said first logic level whereby all rows are cleared to said first logic level.

3. The memory system of claim 2, wherein said row clearing means comprises a plurality of row clearing switching devices each having a control terminal and an output circuit and having their output circuits connected respectively between said row conductors and said source of said first voltage level, and means for applying a third clock pulse to the control terminal of said row clearing switching devices effective during said interval between shift pulses to close said row clearing switching devices thereby to clear said rows to said first voltage level.

4. The memory system of claim 3, wherein said column clearing means comprises a plurality of column clearing switching devices each having a control terminal and an output circuit and having their output circuits operatively connected respectively between said column lines and said source of said first voltage level, and means for applying a fourth clock pulse, comprising a delayed version of said third clock pulse, to the control terminals of said column clearing switching devices.

5. The memory system of claim 4, wherein said fourth clock pulse is derived from said third clock pulse.

6. The memory system of claim 4, further comprising amplifier means operatively connected between said column conductors and said output means, and effective in response to the signals at said column conductors to re-establish said signals at an enhanced signal level.

7. The memory system of claim 6, wherein said amplifier means comprises a plurality of amplifiers each having an input port and an output port, the input ports of said amplifiers being connected respectively to said column conductors and the output ports being operatively connected to said read switches.

8. The memory system of claim 7, wherein said amplifiers each further comprise feedback means connected between the output and input ports thereof, said feedback means including feedback switching means adapted when actuated to feed back the signal at said output port to said input port and means responsive to said column address means for opening said switching means one at a time in timed sequence at a frequency of 1/N*r*.

9. The memory system of claim 8, wherein said amplifiers further comprise an input inverter stage having first and second switching devices each having a control terminal and an output circuit, and having their output circuits connected in series between said sources of said first and second voltage levels, the control terminal of said first switching device being connected to its associated column conductor, and means for impressing said fourth clock pulse on the control terminal of said second switching device, whereby the node capacitance defined at the junction between said first and second switching devices is unconditionally connected to said second voltage level source and disconnected from said first voltage level source during said fourth clock pulse and is conditionally connected to said second voltage level source subsequent to said fourth clock pulse in response to the signal level at its respective column conductor.

10. The memory system of claim 1, wherein said shift register is adapted to store and transfer data signals at one of two logic levels from bit to bit and means effective to set said register with the output of one bit at said second logic level and the outputs of the remaining bits at said first logic level, said signal at said second logic level being said unique row select signal.

11. The memory system of claim 10, wherein said memory switches each comprise a control terminal operatively connected to its respective row conductor, said memory switches being adapted to be closed by the application of a signal at said second logic level to the control terminal thereof and being adapted to be opened by the application of a signal at said first logic level to the control terminal thereof, and wherein said means for opening all of said memory switching devices comprises means effective to operatively connect all of said row conductors to said source of said first logic level whereby all rows are cleared to said first logic level.

12. The memory system of claim 11, wherein said row clearing means comprises a plurality of row clearing switching devices each having a control terminal and an output circuit and having their output circuits connected respectively between said row conductors and said source of said first voltage level, and means for applying a third clock pulse to the control terminal of said row clearing switching devices effective during said interval between shift pulses to close said row clearing switching devices thereby to clear said rows to said first voltage level.

13. The memory system of claim 12, wherein said column clearing means comprises a plurality of column clearing switching devices each having a control terminal and an output circuit, their output circuits being operatively connected respectively between said column lines and said reference voltage source and means for applying a fourth clock pulse, comprising a delayed version of said third clock pulse, to the control terminals of said column clearing switching devices.

14. The memory system of claim 13, wherein said fourth clock pulse is derived from said third clock pulse.

15. A memory or delay circuit comprising a plurality of memory cells arranged respectively at the intersections of a plurality of rows and columns, each memory cell comprising a data storage element for storing a data signal at one of two discrete logic levels, address means for continuously addressing said memory cells, one memory cell at a time, in timed sequence, means responsive to said address means and effective to sense the data signal stored in the addressed memory cell and output means responsive to said addressing means and to the sensed signal for generating an output signal at one of a first or second voltage level corresponding to the logic level of said sensed signal, said output thereby reflecting the sequentially sensed data signals in said memory cells and being identical in character to the output of a shift register having N bits, where N is the number of memory cells in the system, said circuit further comprising conductive means associated with each column, a plurality of semiconductor switching devices operatively connecting said data storage elements to their respective column conductors and effective when closed to transfer said stored data signals to said column conductors, said address means comprising row address means effective to simultaneously close all memory switching devices in a given row, the memory switching devices being closed in timed sequence, row by row, at a given frequency, a plurality of read switching devices operatively connecting said column conductors to said output means, and column address means responsive to said row address means and effective to close said read switches, one at a time, in timed sequence at a frequency of 1/N*r* of said given row address frequency where N*r* is the number of rows in the memory system, and further comprising conductive means associated with each row and operatively connected to the memory cells in that row, said row address means comprising means to apply a unique row select signal at one of said two logic levels to each of said row conductors, one row at a time, in timed sequence, wherein said row address means comprises a ring counter having Nr stages, and wherein said row ring counter comprises a plurality of inverter circuits operatively serially connected to one another and respectively operatively connected to their respective memory switching devices, and said column ring counter comprises a plurality of bistable flip-flop circuits operatively serially connected to one another, each flip-flop circuit having an output node, and wherein said read switching devices each comprise a control terminal and means connecting the control terminals of said read switching devices, respectively, to the output nodes of said flip-flop circuits.

16. The memory system of claim 15, wherein each flip-flop circuit is adapted to store a signal at its output node at one of a first or second signal level, means effective to set one flip-flop circuit with its output node at said second signal level and to set the remaining flip-flop circuits with their output nodes at said first signal level, and means responsive to said row address means for toggling said one flip-flop circuit and the successive flip-flop circuit, whereby said signal at said second signal level is effectively transferred from one flip-flop circuit to the successive flip-flop circuit.

17. The memory system of claim 15, wherein said row ring counter comprises an Nr bit shift register, means connecting the output of the last bit of said register to the input of the first bit of said register, and wherein said row conductors are connected respectively to the output nodes of said register bits.

18. The memory system of claim 17, wherein said shift register is adapted to transfer data signals from one bit to the next during a shift cycle defined by first and second successive clock pulses, means for operatively connecting said column conductors to a source of a first voltage level in the interval between shift cycles, thereby to clear said column conductors to said first voltage level in preparation for the next cycle and means for opening all of said memory switching devices prior to said column clearing operation.

19. The memory system of claim 18, wherein said memory switches each comprise a control terminal operatively connected to its respective row conductor said memory switches being adapted to be closed by the application of a signal at said second logic level to the control terminal thereof and being adapted to be opened by the application of a signal at said first logic level to the control terminal thereof, and wherein said means for opening all of said memory switching devices comprises means effective to operatively connect all of said row conductors to said source of said first logic level whereby all rows are cleared to said first logic level.

20. The memory system of claim 19, wherein said row clearing means comprises a plurality of row clearing switching devices each having a control terminal and an output circuit and having their output circuits connected respectively between said row conductors and said source of said first voltage level, and means for applying a third clock pulse to the control terminal of said row clearing switching devices effective during said interval between shift pulses to close said row clearing switching devices thereby to clear said rows to said first voltage level.

21. The memory system of claim 20, wherein said column clearing means comprises a plurality of column clearing switching devices each having a control terminal and an output circuit and having their output circuits operatively connected respectively between said column lines and said source of said first voltage level, and means for applying a fourth clock pulse, comprising a delayed version of said third clock pulse, to the control terminals of said column clearing switching devices.

22. The memory system of claim 17, further comprising a data input terminal, a plurality of write switches having their output circuits operatively connected respectively between said column conductors and the output nodes of said flip-flop circuits, and having a control terminal, and means connecting said control terminals of said write switches, respectively, to the output nodes of said flip-flop circuits.

23. The memory system of claim 21, further comprising a data input terminal, a plurality of write switches having their output circuits operatively connected respectively between said column conductors and the output nodes of said flip-flop circuits, and having a control terminal, and means connecting said control terminals of said write switches, respectively, to the output nodes of said flip-flop circuits.

24. The memory system of claim 15, wherein said column address means comprises a column ring counter responsive to the output of at least one of said stages of said row ring counter.

25. The memory system of claim 24, wherein each flip-flop circuit is adapted to store a signal at its output node at one of a first or second signal level, means effective to set one flip-flop circuit with its output node at said second signal level and to set the remaining flip-flop circuits with their output nodes at said first signal level, and means responsive to said row address means for toggling said one flip-flop circuit and the successive flip-flop circuit, whereby said signal at said second signal level is effectively transferred from one flip-flop circuit to the successive flip-flop circuit.

26. The memory system of claim 24, further comprising a data input terminal, a plurality of write switches having their output circuits operatively connected respectively between said column conductors and said data input terminal, and having a control terminal, and means connecting said control terminals of said write switches, respectively, to the output nodes of said flip-flop circuits.

27. The memory system of claim 26, wherein each flip-flop circuit is adapted to store a signal at its output node at one of a first or second signal level, means effective to set one flip-flop circuit with its output node at said second signal level and to set the remaining flip-flop circuits with their output nodes at said first signal level, and means responsive to said row address means for toggling said one flip-flop circuit and the successive flip-flop circuit, whereby said signal at said second signal level is effectively transferred from one flip-flop circuit to the successive flip-flop circuit.

28. The memory system of claim 17, wherein said shift register is adapted to transfer data signals from one bit to the next during a shift cycle defined by first and second successive clock pulses, means for operatively connecting said column conductors to a source of a first voltage level in the interval between shift cycles, thereby to clear said column conductors to said first voltage level in preparation for the next cycle and means for opening all of said memory switching devices prior to said column clearing operation.

29. A memory or delay circuit comprising a plurality of memory cells arranged respectively at the intersections of a plurality of rows and columns, each memory cell comprising a data storage element for storing a data signal at one of two discrete logic levels, address means for continuously addressing said memory cells, one memory cell at a time, in timed sequence, means responsive to said address means and effective to sense the data signal stored in the addressed memory cell and output means responsive to said addressing means and to the sensed signal for generating an output signal at one of a first or second voltage level corresponding to the logic level of said sensed signal, said output thereby reflecting the sequentially sensed data signals in said memory cells and being identical in character to the output of a shift register having N bits, where N is the number of memory cells in the system, further comprising conductive means associated with each column, a plurality of semiconductor switching devices operatively connecting said data storage elements to their respective column conductors and effective when closed to transfer said stored data signals to said column conductors, said address means comprising row address means effective to simultaneously close all memory switching devices in a given row, the memory switching devices being closed in timed sequence, row by row, at a given frequency, a plurality of read switching devices operatively connecting said column conductors to said output means, and column address means responsive to said row address means and effective to close said read switches, one at a time, in timed sequence at a frequency where N*r* is the number of rows in the memory system, further comprising amplifier means operatively connected between said column conductors and said output means, and effective in response to the signals at said column conductors to reestablish said signals at an enhanced signal level, wherein said amplifier means comprises a plurality of amplifiers each having an input port and an output port, the input ports of said amplifiers being connected respectively to said column conductors and the output ports being operatively connected to said read switches, and wherein said amplifiers each further comprise feedback means connnected between the output and input ports thereof, said feedback means including feedback switching means adapted when actuated to feed back the signal at said output port to said input port and means responsive to said column address means for opening said switching means one at a time in timed sequence at a frequency of 1/N*r*.

* * * * *